United States Patent Office 3,346,523
Patented Oct. 10, 1967

3,346,523
COATING COMPOSITIONS MADE
FROM OXIMES
Herbert K. Wiese, Cranford, N.J., assignor to Esso
Research and Engineering Company, a corporation
of Delaware
No Drawing. Filed Aug. 3, 1964, Ser. No. 387,215
8 Claims. (Cl. 260—19)

This invention is directed to coating compositions containing improved anti-skinning agents and a method of preserving coating compositions containing drying oils, or other driers which tend to deteriorate by the absorption of oxygen from the air, by adding to such coating compositions an organic oxime having a tertiary, alpha-hydroxy or -alkoxy substituent, viz., an organic oxime selected from the group consisting of: tertiary, alpha-hydroxy oximes and tertiary, alpha-alkoxy oximes.

Many types of air-hardenable coating compositions, such as varnishes, lacquers, etc., when exposed to air either in open or closed containers, tend to develop rubber-like skins over or near exposed surfaces or to become thick or livery, and no amount of stirring will serve to restore their normal homogeneous character. This capacity for becoming heterogeneous, commonly referred to in the art as "skinning," is not merely the results of gravitational separation of constituents, such as results as when a heavy pigment settles in a lighter vehicle, but is chemical in nature. Skinning is generally attributed to oxidation or to polymerization in the presence of oxygen or certain constituents, such as drying oils (vehicular constituents of paints and enamels), which give to the coating compositions an ability to "air-harden" and thus form durable coatings.

It is known that many organic compounds when present in such coating compositions prevent, or at least inhibit, the skinning previously referred to, and materials which inhibit these effects are referred to as "anti-skinning agents."

While anti-skinning agents vary widely in their ability to eliminate or substantially diminish skinning, many of the more efficient anti-skinning agents induce undesirable discoloration of the liquid varnishes, lacquers, etc., to which they are added to prevent skinning. This in turn results in discolorations of the dried films, which discoloration is highly objectionable, especially in cases where clear varnishes, light colored lacquers, etc., are involved.

These air-hardenable coating compositions usually contain an evaporable solvent or dispersion medium (carrier), a resin soluble (or readily dispersible) therein, and a drier to aid in drying the films formed when these compositions are applied to surfaces to be protected. As used herein, the terms "soluble" and "dispersible" are synonymously employed.

According to the present invention, the undesirable skinning can be eliminated or substantially inhibited while at the same time avoiding discoloration of the air-hardenable coating composition by adding thereto a tertiary, alpha-hydroxy or alkoxy oxime, viz., an organic oxime in which the hydroxy or alkoxy substituent is present on a tertiary carbon atom which is adjacent to (alpha positioning with respect to) the carbon atom containing the oximino group, viz., the =NOH group. Usually, the tertiary, alpha - hydroxy or -alkoxy oxime anti - skinning agents whose use is contemplated in accordance with this invention are aliphatic, tertiary, alpha-hydroxy or -alkoxy oximes having from 4 to 40 carbon atoms.

Preferably the aliphatic, tertiary, alpha - hydroxy or -alkoxy oximes are alkyl, tertiary, alpha-hydroxy or -alkoxy oximes having from 5 to 40 carbon atoms per molecule. A perferred class of alkyl, tertiary, alpha-hydroxy and -alkoxy oximes are those of the formula:

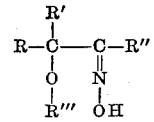

wherein R and R' are alkyl groups containing from 1 to 8 carbon atoms and R" and R'" are selected from the group consisting of: hydrogen and alkyl groups having from 1 to 8 carbon atoms.

The R, R', R" and R'" (where alkyl) groups can be any alkyl group having from 1 to 8 carbon atoms, e.g. methyl, ethyl, n-propyl, iso-propyl, n-butyl, iso-butyl, tert-butyl, amyl, iso-amyl, hexyl, heptyl, octyl, and isomers thereof.

Suitable exemplary preferred alkyl, tertiary, alpha-hydroxy or -alkoxy oximes coming within the above formula include, but are not limited to, the following: 3-hydroxy-3-methyl-butanone-2 oxime; 3-methoxy-3-methyl-2-butanone oxime; 3-hydroxy-3-methyl-2-pentanone oxime; 3-methoxy-3-methyl-2-pentanone oxime; 3-hydroxy-3-ethyl-2-pentanone oxime; 3-methoxy - 3 - ethyl-2-pentanone oxime; 3-ethoxy-3-methyl-2-butanone oxime; 4-ethoxy-4-methyl-3-hexanone oxime; 3-propoxy-3-methyl-2-pentanone oxime; 4-propoxy-4-ethyl-3-hexanone oxime; 4-hydroxy-4-ethyl-3-hexanone oxime; 5-hydroxy-5-propyl-4-octanone oxime; 5-propoxy-5-propyl-4-octanone oxime; 5-hydroxy-5-methyl - 4 - heptanone oxime; 4 - methoxy-4-methyl-3-heptanone oxime; 6-hydroxy - 6 - methyl-5-decanone oxime; 6-methoxy-6-methyl-5-decanone oxime; 6-ethoxy-6-butyl-5-decanone oxime; 3-hydroxy-3-propyl-3-octanone oxime; 7-butoxy-7-amyl-6-dodecanone oxime; 3-hydroxy - 3 - methyl - 2 - nonanone oxime; 9-methoxy-9-methyl-8-hexadecanone oxime; 9-hydroxy-9-butyl-8-hexadecanone oxime; 10 - hydroxy - 10 - octyl-9-octadecanone oxime; 10-butoxy-10-octyl-9-octadecanone oxime; 10-hexoxy-10-octyl-9-octadecanone oxime; 10-octoxy-10-octyl-9-octadecanone oxime; 2-hydroxy-2-ethyl-3-nonanone oxime; 3-amyloxy-3-ethyl-2-pentanone oxime; 2-heptyloxy-2-ethyl-2-butanone oxime; etc.

The $C_4$ to $C_{26}$ alkyl, tertiary, alpha hydroxy oximes indicated above as within the preferred class of oximes defined by the above structure formula can be prepared readily by reacting either nitrosyl chloride or nitrosyl sulfuric acid with the corresponding olefin followed by hydrolysis using either acid or basic hydrolysis conditions.

The $C_6$ to $C_{34}$ alkyl, tertiary, alpha-alkoxy oximes indicated above as within the preferred class of oximes defined by the above structure formula can be prepared readily by the addition of an alkyl nitrite to the corresponding olefin in the presence of an acid catalyst (Lewis or Bronsted acids) at temperatures ranging from −30 to 250° C. and pressures ranging from 0.1 to 300 atmospheres for time periods ranging from 1 minute to 20 hours, the alkyl nitrite (R'"—ONO) with a

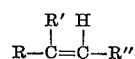

olefin to form the corresponding

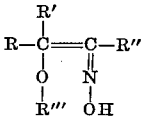

oxime (wherein the R, R', R" and R'" alkyl substituents are as set forth above in the structural formula).

Because of their superior anti-skinning properties and substantial freedom from discoloration in the dried films, the $C_4$ to $C_{14}$ alkyl, tertiary, alpha-hydroxy oximes wherein R, R' and R" each contain from 1 to 4 carbon atoms and the $C_6$ to $C_{18}$ alkyl, tertiary, alpha-alkoxy oximes wherein R, R', R" and R'" each contain from 1 to 4 carbon atoms are particularly preferred anti-skinning agents for use in the improved coating compositions of this invention. An outstanding $C_4$ to $C_{14}$ alkyl, tertiary, alpha-hydroxy oxime in this regard is 3-hydroxy-3-methyl-2-butanone oxime. A superior $C_6$ to $C_{18}$ alkyl, tertiary alpha-alkoxy oxime in this sense is 3-methoxy-3-methyl-2-butanone oxime.

Nothing has arisen during the experimentation with and practice of this invention which would lead one to any other conclusion than that the broad class of aliphatic oximes (containing a tertiary hydroxy or alkoxy group in alpha position to the oximino group) will function as anti-skinning agents which avoid or lessen discoloration of the dried varnish or lacquer films.

Normally, according to this invention, a wide latitude is permissible in the proportions of the said anti-skinning agents which can be used, e.g., from 0.05 to 5.0 weight percent based on non-volatile matter (100% solids). Usually, however, for most varnishes, lacquers, etc., a weight concentration of said anti-skinning agent(s) of from about 0.05 to 2.0% is used. Preferably the weight concentration of the anti-skinning agent ranges from 0.05 to 1.0%.

To demonstrate (A) the combined anti-skinning and film color preservation properties of the improved coating compositions of this invention and (B) the necessity of employing oximes having both (1) tertiary-hydroxy or -alkoxy substitution, and (2) alpha positioning of (1) with respect to the oximino group of the oxime, the below examples include performance data on commercial anti-skinning agents of the prior art and aliphatic oximes lacking either (1) or (2) as compared to the improved coating compositions of this invention containing an anti-skinning agent meeting both requirements (1) and (2). The anti-skinning agents employed herein cause less discoloration of the liquid varnishes, lacquers, etc., and substantially no discoloration of the dried films formed therefrom.

The invention will be illustrated in greater detail by the examples which follow.

EXAMPLE 1.—ANTI-SKINNING PERFORMANCE

*Alkyd varnish* [1]

| Component: | Conc. (wt. percent) |
|---|---|
| Phthalic anhydride | 25 |
| Linseed acids | 55 |
| Polyol | 20 |

[1] Alkyd, P-381-70 Beckosol (meeting Specification No. TTR-266, Type III, Class A).

TABLE 1

| Sample | Anti-Skinning Agent | | | Days to Hard Skin | |
|---|---|---|---|---|---|
| | Oxime | Structure | Conc. (wt. percent) [a] | Alkyd Varnish | Phenolic-Tung Oil Varnish |
| (1) | None (Control) | | | 2 | 1 |
| (2) [b] | Methyl ethyl ketone oxime | $CH_3-CH_2-C-CH_3$, $\parallel$ NOH | 0.125 / 0.500 / 1.000 | 13 / 13 / 40 | 1 / 1 / 2 |
| (3) [b] | Butyraldehyde oxime | $CH_3-CH_2-CH_2-C(H)=NOH$ | 0.125 / 0.500 | [c] N.D. / [c] N.D. | 1 / 3 |
| (4) [d] | 3-hydroxy-3-methyl-2-butanone oxime | $CH_3-C(CH_3)(OH)-C(=NOH)-CH_3$ | 1.000 / 0.125 / 0.500 | [c] N.D. / 28 / [c] N.D. | 8 / 1 / 8 |
| (5) | 4-hydroxy-4-methyl-2-pentanone oxime | $CH_3-C(CH_3)(OH)-CH_2-C(=NOH)-CH_3$ | 1.000 / 1.000 | [c] N.D. / [c] N.D. | 21 / 2 |
| (6) [d] | 3-methoxy-3-methyl-2-butanone oxime | $CH_3-C(CH_3)(OCH_3)-C(=NOH)-CH_3$ | 0.125 / 0.500 / 1.000 | 6 / 20 / 40 | 1 / 1 / 2 |
| (7) | 3-hydroxy-2-butanone oxime | $CH_3-C(H)(OH)-C(=NOH)-CH_3$ | 0.125 | 2 | [c] N.D. |
| (8) [d] | 2-hydroxy-2-methyl-propionaldehyde oxime | $CH_3-C(CH_3)(OH)-C(H)=NOH$ | 0.22 | 11 | [c] N.D. |
| (9) | 2-methoxy-2-methyl-cyclohexanone oxime | cyclohexanone ring with $OCH_3$, $CH_3$, and $C=NOH$ substituents | 0.225 | 6 | [c] N.D. |

[a] Based on NVM.  [b] Commercial anti-skinning agents.  [c] Not determined.  [d] Anti-skinning agents used according to this invention.

Phenolic-tung oil varnish [1]

| Component: | Conc. (wt. percent) |
|---|---|
| Para phenyl-phenol-formaldehyde resin | 33.5 |
| Raw tung oil | 66.5 |

[1] Phenolic-tung oil varnish (meeting Specification No. MIL-E-12507, Class II-A).

The above alkyd and phenolic-tung oil vehicles were cut to 50% non-volatile matter with varsol and the following driers added:

Alkyd varnish

| Drier: | Conc. (wt. percent)[1] |
|---|---|
| Cobalt naphthenate | 0.03 |
| Lead naphthenate | 0.60 |

[1] Wt. percent metal based on NVM.

Phenolic-tung oil varnish

| Drier: | Conc. (wt. percent)[1] |
|---|---|
| Lead naphthenate | 0.2 |
| Cobalt naphthenate | 0.02 |
| Manganese naphthenate | 0.01 |

[1] Wt. percent metal based on tung oil.

Identical samples of alkd and phenolic-tung oil varnishes are prepared from the formulations tabulated above. Then an anti-skinning agent is added to each sample in the varying weight concentrations noted above in Table 1. One sample has no anti-skinning agent. Then the varnishes are tested for skin formation using the procedure outlined in the Official Digest, Federation of Paint and Varnish Production Club, vol. 28, November 1956, No. 382, page 1086. The comparative performance data are summarized in Table 1.

As noted from the data in Table 1 preceding, the "anti-skinning" performance of the three coating compositions exemplary of this invention and containing an oxime having both tertiary-hydroxy or -alkoxy substitution and alpha positioning of the tertiary-hydroxy, or -alkoxy substituted with respect to the oximino group, viz., (4), (6) and (8), is far superior to the control, viz., (1) where no anti-skinning agent is present in the varnish.

Moreover, the performances of (4), (6) and (8) compare favorably in inhibition of skinning with that of two prior art oximes, viz., (2) and (3), presently used commercially. This favorable anti-skinning behavior coupled with superior inhibition of discoloration (as illustrated in Table 2, below) clearly establish the merit of the coating compositions of this invention.

However, when hydroxy or alkoxy oximes lack either tertiary or alpha positioning, the ability of the oxime to retard skinning is impaired. Thus, for example, when the hydroxy or alkoxy substituent is tertiary, but non-alpha, e.g. beta with respect to the oximino group, viz., (5), the anti-skinning behavior is lessened. On the other hand, when the hydroxy or alkoxy substituent is alpha to the oximino group, but non-tertiary, e.g., secondary as in (7), results are likewise inadequate.

For a given weight percent concentration, the 2-methoxy-2-methyl cyclohexanone oxime (9) is less efficient than the 3-methoxy-3-methyl butanone oxime (6) even though both contain the same constituents. One of the reasons for this is that the molecular weight for the 2-methoxy-2-methyl cyclohexanone oxime is greater than the molecular weight for the 3-methoxy-3-methyl-2-butanone oxime and, therefore, the actual concentration of the active oxime and alkoxy groups on a mole per weight basis is less wth the 2-methoxy-2-methyl cyclohexanone oxime.

EXAMPLE 2.—AVOIDANCE OF DISCOLORATION

The alkyd and phenolic-tung oil varnishes used for measuring extent of discoloration were prepared according to the method of preparation set forth in Example 1.

Then various anti-skinning agents were added thereto in the amounts noted in Table 2 below. Two samples, (1) and (5), have no agent. The color of the respective varnishes is checked before and after drying using a Gardner Color and Gardner Color Difference Meter, and the appropriate color values are noted in Table 2, along with drying times required to form tack-free films.

The respective varnishes are brush coated onto a wood test panel made from pine wood. The first coat was allowed to dry and the drying times measured after the second coat was applied. The color of the films was measured after the second coat was completely dry. The color values are tabulated in Table 2, below.

As will be apparent from the above data, the improved coating compositions of this invention, viz., (3), (4), and (7) show less discoloration of the liquid varnishes and dried films formed therefrom than the same varnish formulations only containing commercial prior art anti-skinning agents, viz., (2) and (6). In fact there is practically no discoloration noted in the dry films formed from the exemplary liquid varnishes of the present invention as compared to their respective controls, viz., (1) and (5).

However, a hydroxy or alkoxy oxime failing to satisfy both the tertiary and alpha position requirements (of the oximes whose use is contemplated in this invention) gives very poor color performance. Thus, the oxime of (8), whose hydroxy substituent is tertiary, but beta to the oximino group, gave such poor results as to disqualify it from use in clear varnishes.

TABLE 2

| Sample | Oxime | Varnish | Conc. (wt. percent) [a] | Color Data | | Tack-Free Time (Hrs.) |
|---|---|---|---|---|---|---|
| | | | | Liquid Varnish [b] | Dry Film [c] | |
| (1) Control | None | Alkyd | | 7 | +5.4 | 5½ |
| (2) | Methyl ethyl ketone oxime [d] | do | 1.0 | 13 | +6.1 | 7¼ |
| (3) | 3-methoxy-3-methyl-2-butanone oxime [e] | do | 1.0 | 11 | +5.4 | 5½ |
| (4) | 3-hydroxy-3-methyl-2-butanone oxime [e] | do | 0.125 | 9 | +5.3 | 8¼ |
| (5) | None | Phenolic-tung oil | | 12 | N.D. | N.D. |
| (6) | Butyraldehyde oxime [d] | do | { 0.5 / 1.0 | 14 / 15 | N.D. / N.D. | N.D. / N.D. |
| (7) | 3-hydroxy-3-methyl-2-butanone oxime [e] | do | { 0.5 / 1.0 | 12 / 12 | N.D. / N.D. | N.D. / N.D. |
| (8) | 4-hydroxy-4-methyl-2-pentanone oxime | do | 1.0 | >>15 Very cloudy | N.D. | N.D. |

[a] Based on NVM.
[b] Gardner color. Liquid varnish color measured after varnish had stood for 20 days in inverted bottle as outlined in test procedure for measuring skin formation.
[c] Gardner Color Difference Meter—The higher the value the more yellow the film, and hence the greater the discoloration.
[d] Commercial prior art oxime anti-skinning agents.
[e] Anti-skinning agents employed in this invention.
N.D.=Not Determined.

While the above examples illustrate the present invention in great detail with regard to alkyd and phenolic-tung oil varnishes, it should be clearly understood that the advantageous combination of properties attained by inclusion of the anti-skinning agents whose use is contemplated herein is broadly applicable to coating compositions which are air-hardenable and subject to skinning, e.g. varnishes, lacquers, etc. Suitable exemplary varnishes and other coating compositions, in which the anti-skinning agents contemplated in this invention can be employed, are listed in Kirk-Othmer Encyclopedia of Chemical Technology, vol. 1, pages 517 to 531 and vol. 14, pages 645 to 663, the disclosure of which is incorporated herein by reference. Those resins disclosed by Kirk-Othmer include alkyds, phenolics, epoxies and various natural resins such as rosin terpenes, etc. Consequently, the present invention envisions the use of a resin(s) selected from the group consisting of alkyds, phenolics, epoxies and natural resins.

While the present invention has been illustrated in great detail in the foregoing examples, it should be realized that the present invention in its broadest aspects is not necessarily limited to the concentrations, materials, procedures, etc., as set forth in the examples.

What is claimed is:
1. An air-hardenable coating composition comprising an evaporable solvent, a resin soluble in said solvent and selected from the group consisting of alkyds, phenolics, epoxies and natural resins, a drier and from 0.05 to 5.0 percent by weight of an alkyl oxime containing from 4 to 40 carbon atoms and selected from the group consisting of tertiary, alphahydroxy alkyl oximes and tertiary, alpha-alkoxy alkyl oximes.

2. An air hardenable coating composition as in claim 1 wherein said resin is an alkyd resin.

3. An air-hardenable coating composition comprising an evaporable solvent, a resin soluble in said solvent and selected from the group consisting of alkyds, phenolics, epoxies and natural resins, a drier and from 0.05 to 2.0 percent by weight of an alkyl oxime of the formula:

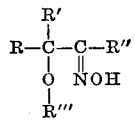

wherein R and R' are alkyl groups containing from 1 to 8 carbon atoms, and R" and R''' are selected from the group consisting of: hydrogen and alkyl groups having from 1 to 8 carbon atoms.

4. An air-hardenable coating composition as in claim 3 wherein R, R' and R" are alkyl groups containing from 1 to 4 carbon atoms, and R''' is selected from the group consisting of: hydrogen and alkyl groups having from 1 to 4 carbon atoms.

5. An air hardenable coating composition as in claim 3 wherein said oxime is 3-methoxy-3-methyl-2-butanone oxime.

6. An air-hardenable coating composition as in claim 3 wherein said oxime is 3-hydroxy-3-methyl-2-butanone oxime.

7. An air-hardenable coating composition as in claim 3 wherein the concentration of said oxime ranges from 0.05 to 1.0 percent by weight.

8. An air-hardenable coating composition comprising an evaporable solvent, a phenolic resin soluble in said solvent, a drier and from 0.05 to 5.0 percent by weight of an alkyl oxime containing from 4 to 40 carbon atoms and selected from the group consisting of tertiary, alpha-hydroxy alkyl oximes and tertiary, alpha-alkoxy alkyl oximes.

References Cited

UNITED STATES PATENTS

| | | | |
|---|---|---|---|
| 2,496,198 | 1/1950 | Butterbaugh | 260—566 |
| 2,734,084 | 2/1956 | Doerner | 260—566 |
| 2,872,426 | 2/1959 | Harshman | 260—19 |
| 2,901,450 | 8/1959 | Beacham | 260—19 |
| 2,971,028 | 2/1961 | Gray | 260—566 |

FOREIGN PATENTS 560,897   4/1944   Great Britain.

OTHER REFERENCES

Academie des Sciences Paris Comptes rendus, Vol. 249, pages 1643 to 1645, Feb. 26, 1962.

Circular 738; Scientific Section; National Paint, Varnish and Lacquer Association, Inc.; Washington, D.C.; May 1950; pages 58 and 71 relied upon.

"Synthetic Resins," published by Reichhold Chemicals, Inc., White Plains, N.Y. (1954), cover page and page 91 relied upon.

DONALD E. CZAJA, *Primary Examiner.*

LEON J. BERCOVITZ, *Examiner.*

F. McKELVEY, *Assistant Examiner.*